Sept. 21, 1965   J. W. TOENSING   3,207,650
TAPE WRAPPING MACHINE

Filed Aug. 1, 1961   4 Sheets-Sheet 1

INVENTOR.
JAMES W. TOENSING
BY
Carpenter, Abbott, Coulter & Kinney
ATTORNEYS

Sept. 21, 1965                J. W. TOENSING                3,207,650
                            TAPE WRAPPING MACHINE
Filed Aug. 1, 1961                                      4 Sheets-Sheet 2

INVENTOR.
JAMES W. TOENSING
BY
Carpenter, Abbott, Coulter & Kinney
ATTORNEYS

Sept. 21, 1965     J. W. TOENSING     3,207,650
TAPE WRAPPING MACHINE

Filed Aug. 1, 1961     4 Sheets-Sheet 3

INVENTOR.
JAMES W. TOENSING
BY
*Carpenter, Abbott, Coulter & Kinney*
ATTORNEYS

Sept. 21, 1965  J. W. TOENSING  3,207,650
TAPE WRAPPING MACHINE
Filed Aug. 1, 1961  4 Sheets-Sheet 4

INVENTOR.
JAMES W. TOENSING
BY
Carpenter, Abbott, Coulter & Kinney
ATTORNEYS

United States Patent Office 3,207,650
Patented Sept. 21, 1965

3,207,650
TAPE WRAPPING MACHINE
James W. Toensing, Minneapolis, Minn., assignor to Minnesota Mining and Manufacturing Company, St. Paul, Minn., a corporation of Delaware
Filed Aug. 1, 1961, Ser. No. 128,437
4 Claims. (Cl. 156—446)

This invention relates to a machine for wrapping articles with adhesive tape. More particularly, the present invention is concerned with apparatus for wrapping a rotating article with tape which is, or can be made to be, adhesive to an article which is brought into contact with it.

The embodiment of the invention which is shown in the attached drawings has been particularly adapted for use in wrapping the shaft of a metal spool with a few windings of electrical insulating tape which has a pressure-sensitive adhesive coating on one side. After the shaft has been wrapped with such tape by this machine, the shaft is wound with wire, and another wrapping of tape can be applied over the wire by the use of this same machine in order to insulate the exterior surface of the wire, to provide an insulated electrical coil.

The present invention provides means for rotating the metal spool as the shaft of the spool is in contact with the free end from a supply of tape while the free end is supported by a tacking member, in order to attach the end to the shaft, and a buffing member which, as the spool is rotated, supports tape adjacent to the end of the tape after the end has been attached to the shaft, said buffing member serving to attach the adjacent tape to the shaft. Means is provided for moving the spool relative to the tacking member and the buffing member after the free end has been attached to the rotating spool, so that the support for the tape being attached to the spool is then shifted from the tacking member to the buffing member.

In the use of the machine herein described, tape from a supply roll is brought over the face of a tacking block, with its adhesive side facing the article to be wrapped, and the rotating article is moved into contact with the free end of the tape as the free end is supported by the tacking block. The buffing member is a buffing block which is attached with the tacking block to a movable plate, and after the free end of the tape has been attached to the rotating article the plate is moved so that the buffing block supports the tape adjacent to the end of the tape as that adjacent tape is attached to the rotating article. A severing means comprising a movable knife is attached through the movable plate, intermediate the tacking block and the buffing block, and, after the desired amount of tape adjacent to the end of the tape has been attached to the rotating article, the knife is actuated to sever the tape accross the width thereof, and the end which is severed from the supply is buffed into attachment with the article as the article continues to rotate while the buffing block supports that tape. The rotational movement of the wrapped article is then stopped, and the wrapped article is released from the machine.

The present invention, and the various objectives and advantages obtained thereby, will be apparent from a detailed description of the illustrative embodiment shown in the accompanying drawings, wherein like reference characters refer to similar parts in the corresponding views, and in which that part of the machine which is shown to be at the left in FIGURE 1 will be referred to as the "front." Movement toward the left of FIGURE 1 will be referred to as "forward movement" or "forwardly." The terms "up" or "upwardly" and "down" or "downwardly" should be understood to refer to those directions as they would appear to one viewing the machine as it is shown in FIGURE 1.

Figure 1:
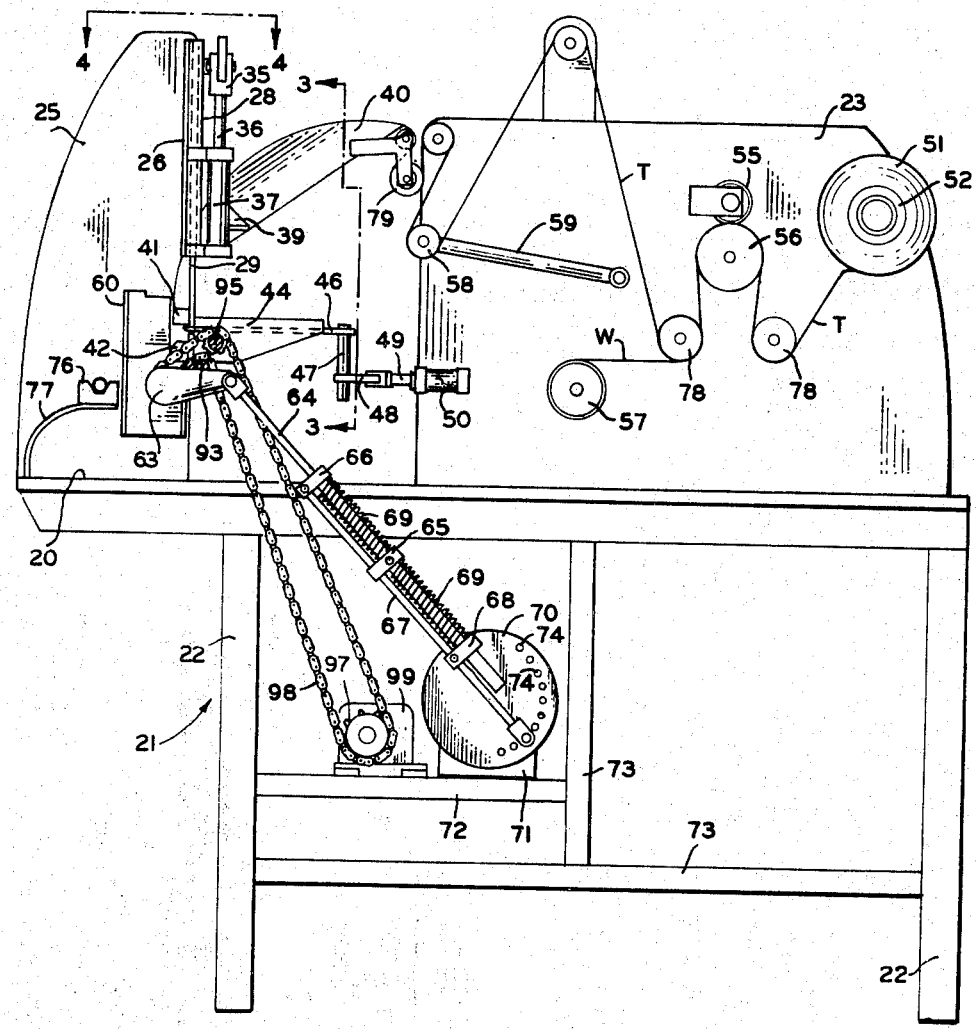
FIGURE 1 is a side elevational view of a machine of this invention, after some of the supporting structure at the front of the machine has been removed for purposes of clarity, showing the apparatus in position to begin wrapping an article with tape.
Figure 2:
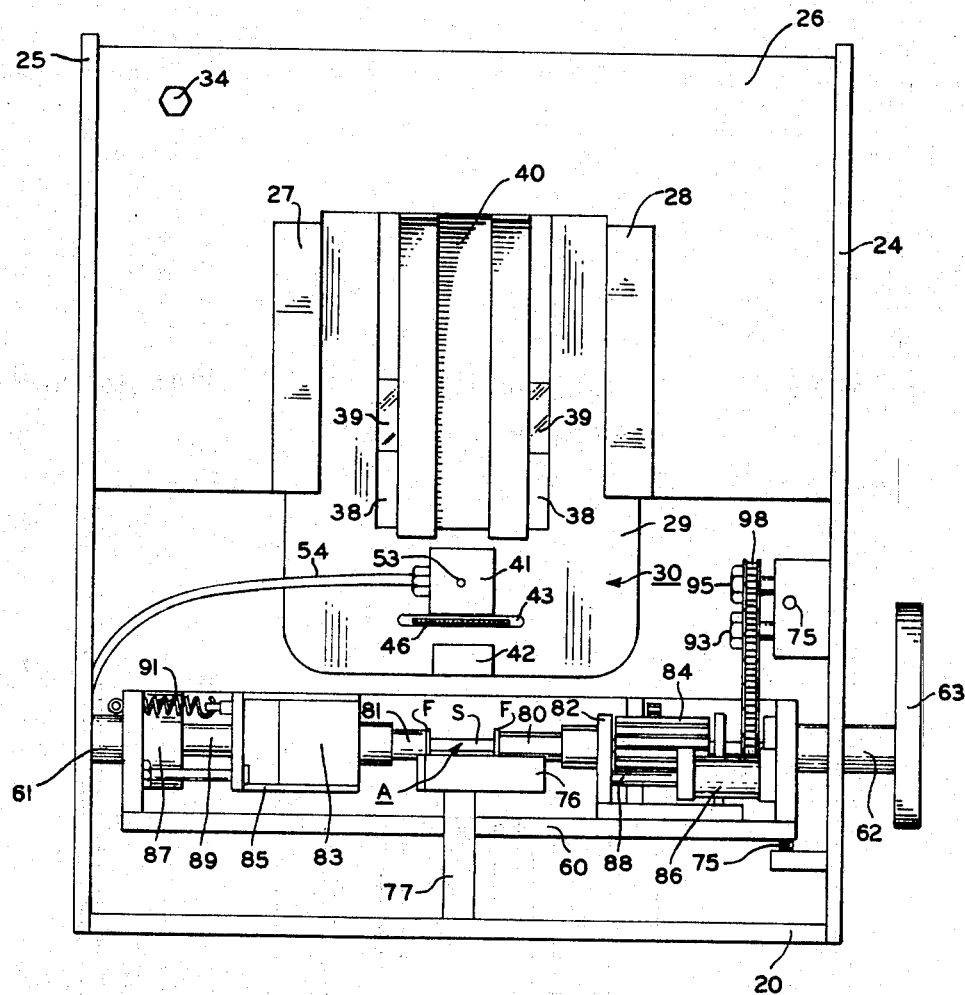
FIGURE 2 is a front elevational view of the upper part of the machine after the supporting structure which was removed for FIGURE 1 has been replaced, with the article transporting mechanism pivoted forwardly through approximately a right angle, and with the tape removed, for purposes of clarity.

Referring first to FIGURES 1 and 2, the taping apparatus shown in the drawings is attached to the top surface 20 of a rectangularly shaped table which is indicated generally by the reference character 21. Table 21 is supported by legs 22 at each of the four corners thereof. A tape plate 23 is attached perpendicularly to top surface 20, at approximately the middle of said top surface, and two support plates 24 and 25 are attached to each side and at the same end of top surface 20, and said support plates extend upwardly at right angles therefrom. A bridge plate 26 is attached between support plates 24 and 25, and said bridge plate is constructed to contain a centrally positioned square shaped cut-out portion. A pair of slide channels 27 and 28 are affixed to bridge plate 26 and extend along each side of said cut-out portion.

Figure 3:
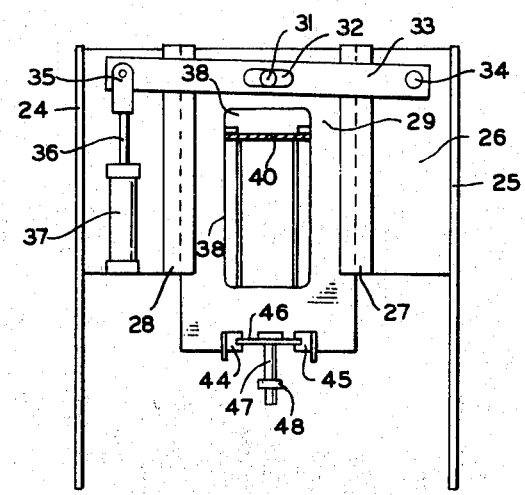
FIGURE 3 is a view taken in the direction indicated by the line 3—3 in FIGURE 1, with part of the tape chute shown in section, for reasons of clarity.

Referring now to FIGURES 2 and 3, a tape deck which is indicated generally by the reference character 30 includes a slide plate 29 which is slidably held in slide channels 27 and 28 by a bolt 31 which is attached to slide plate 29 and extends through a slot aperture 32 in a pivot bar 33. One end of pivot bar 33 is pivotally attached by bolt 34 to bridge plate 26, and the other end of said bar is attached to a clevis 35 on the end of the cylinder rod 36 of an air cylinder 37. Air cylinder 37 is affixed to bridge plate 26. Thus, when compressed air is allowed to enter air cylinder 37, movement of cylinder rod 36 will cause slide plate 29 to move upwardly in slide channels 27 and 28 on bridge plate 26, and the weight of slide plate 29 will cause said plate to be moved downwardly when compressed air is allowed to escape from air cylinder 37.

Figure 4:
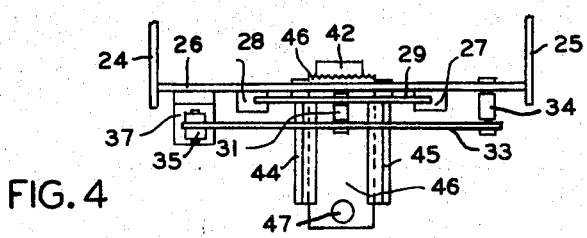
FIGURE 4 is a view taken in the direction indicated by the line 4—4 in FIGURE 1, after the tape chute has been entirely removed, for reasons of clarity.

In addition to slide plate 29, tape deck 30 includes the members which are attached to, and are moved with, slide plate 29. As is shown in FIGURES 2 and 3, a rectangular shaped aperture 38 is formed in the central portion of slide plate 29, and a tape chute 40 is attached through said aperture and to said plate by brackets 39. A tacking block 41 is attached to the forward side of slide plate 29, adjacent to and below tape chute 40, and a buffing block 42 is attached to slide plate 29 in a position spaced slightly from and below tacking block 41. A horizontal aperture 43 is formed through slide plate 29, between tacking block 41 and buffing block 42, nd, as is shown in FIGURES 3 and 4, slide channels 44 ad 45 are attached to each end of said aperture and xtend rearwardly therefrom at right angles to slide plate ). A knife 46, having a serrated sharpened forward nd, is slidably held within slide channels 44 and 45.

Referring now to FIGURES 1, 3 and 4, a pin 47 is ffixed through the unsharpened end of knife 46, and a levis 48 is slidably attached around pin 47 and to the ylinder rod 49 of an air cylinder 50. Air cylinder 50 affixed to tape plate 23. Thus, when compressed air permitted to enter air cylinder 50, rod 49 will be moved ut of said cylinder, causing the forward edge of knife 46 ) move forwardly, between tacking block 41 and buffing lock 42, to sever tape which extends between said blocks. .ir cylinder 50 contains an internal spring which is attched to rod 49, which spring serves to retract said rod hen the compressed air is allowed to escape from said ylinder. The slidable attachment of clevis 48 and pin 7 permits the upward and downward movement of said in with knife 46 while the air cylinder 50 operates from fixed position.

A roll 51 of pressure-sensitive adhesive tape T is nounted on a hub 52, and said hub is rotatably attached ) tape plate 23. The unwound tape T from tape roll 1 is threaded, with the adhesive side facing upwardly, round a series of rollers which are attached to tape late 23 and to tape chute 40, and tape T then extends own the guideway in tape chute 40 and over tacking lock 41 until the free end of the tape is positioned at 1e lower edge of said tacking block. A vacuum port 53 1 tacking block 41 is attached by a hose 54 to a source f vacuum pressure (not shown), and said pressure serves o hold the free end E of the tape T against the tacking lock.

In the taping of electrical coils it is important that the vidth of the tape be extremely accurate, and, in order o accomplish this, the tape on the supply roll 51 can e of a greater width than is desired, and the width educed by trimming one edge from the tape T as it is inwound from roll 51 and guided forwardly through the nachine. In the illustrated embodiment, this is done by iroviding a sharp-edged rotatable cutter wheel 55 which s attached in a position whereby it will bear against a iardened steel roller 56, and the edge W which has been rimmed from the tape T can be wound on a driven oller 57, all of which members are attached to tape late 23. Any slack which develops in the trimmed tape [ as it is moved forwardly through the machine can be :ontrolled by use of a take-up roller 58 which is rotatably ittached to the free end of an arm 59, which arm is )ivotably attached to tape plate 23.

The present invention includes means for holding the irticle to be wrapped with the tape, means for rotating .he holding means to rotate the article and means for ransporting the holding means toward and away from he tape wrapping position. In the illustrated machine, hese means are attached to a trunnion 60. As is shown n FIGURES 2 and 5, the trunnion 60 is pivotably atached by stub shafts 61 and 62 to support plates 25 and !4, respectively, for rotational movement back and forth etween the positions shown in FIGURES 1 and 2 to ransport the article. Stub shaft 62 extends through upport plate 24, and a crank arm 63 is affixed to the nd of said shaft. A crank rod 64 is pivotally attached at ne end to crank arm 63, and crank block 65 is affixed o said rod. Crank block 65 contains an aperture hrough which a drive rod 67 is slidably attached. A air of drive blocks 66 and 68 are affixed to drive rod i7, and said drive blocks each contain an aperture hrough which crank rod 64 is slidably attached. Helizally wound compression springs 69 are attached around :rank rod 64, with one end of each of said springs abuting against crank block 65. The other end of said iprings bears against drive blocks 66 and 68. One end of drive rod 67 is pivotally attached to a rotatable wheel 70, which wheel is attached to, and driven by a brake motor 71 through a reducer gear attached between said wheel and said motor. Brake motor 71 is attached to a platform 72, which platform is affixed to a right angle frame 73 affixed to legs 22 and the bottom of top surface 20 of table 21.

Wheel 70 is provided with a plurality of apertures 74 which are spaced at varying distances from the center attachment of said wheel, in order that the position for the attachment of drive rod 67 can be adjusted. When drive rod 67 is so attached, the rotational movement of wheel 70 by motor 71 causes drive blocks 66 and 68 to slide back and forth on crank rod 64, alternately compressing springs 69 against crank block 65, causing crank block 65 to be driven back and forth on drive rod 67 as it is moved to carry crank rod 64 in a back and forth movement. Thus, attachment of crank rod 64 to crank arm 63 causes trunnion 60 to be pivoted back and forth with each full revolution of wheel 70. A pair of adjustable stops 75 are attached to support plate 24, and trunnion 60 bears against those stops when it is successively pivoted back and forth between the positions shown in FIGURES 1 and 2.

One end of a bracket 77 is affixed to top surface 20, and a block 76 is affixed to the other end of said bracket. The article to which the tape T is to be attached is placed on block 76 and trunnion 60 transports the article from that position to the wrapping position.

Figure 5:
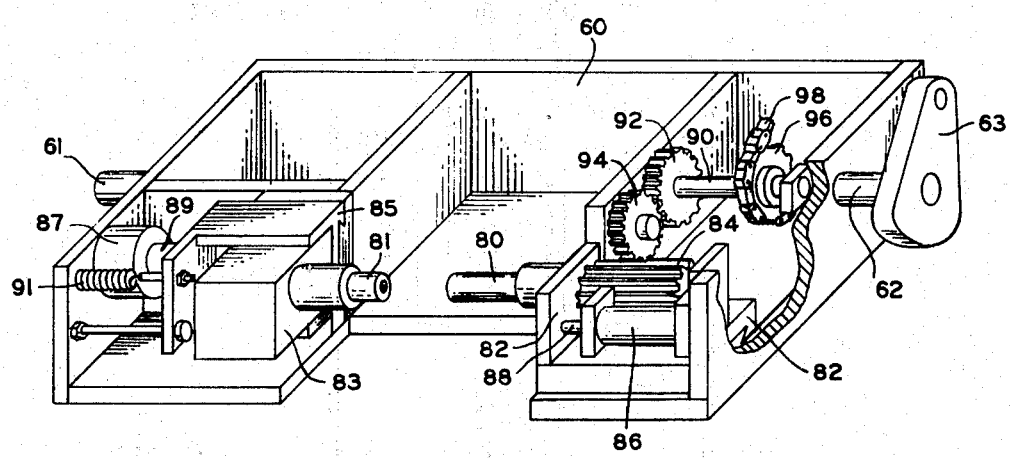
FIGURE 5 is a perspective view of the article transporting mechanism after it has been entirely removed from the machine, with part of the structure of that mechanism broken away, for reasons of clarity.

In order to hold and rotate the article, trunnion 60 is provided with a pair of rotatable spindles 80 and 81. As is shown in FIGURES 2 and 5, the spindle 81 is rotatably attached to a block 83, and said block is affixed to a slidable cradle 85. An air cylinder 87 is attached to trunnion 60, and cylinder rod 89 of air cylinder 87 is attached to cradle 85. A spring 91 is attached to trunnion 60 and to cradle 85, so that the admission of compressed air to air cylinder 87 will cause spindle 81 to be moved toward spindle 80, and spring 91 will act to retract spindle 81 when the compressed air is allowed to escape from air cylinder 87. A cradle 82 is slidably attached to the other side of trunnion 60, and spindle 80 is rotatably attached through the side of said cradle to a rotatable drum gear 84, which drum gear is rotatably suspended within said cradle. A double-acting air cylinder 86 is attached to trunnion 60, and the cylinder rod 88 in said cylinder is attached to cradle 82. Thus, the admission of compressed air to the advance side of air cylinder 86 will cause spindle 80 to be moved toward spindle 81, and the admission of compressed air to the retract side of air cylinder 86 will cause spindle 80 to be moved away from spindle 81.

A shaft 90 is rotatably attached at each of its ends to trunnion 60, and a gear 92 is affixed on said shaft. A gear 94 is attached to trunnion 60 and positioned so that the teeth on said gear engage the teeth on both of the gears 92 and 84, so that the rotational movement of shaft 90 will cause spindle 80 to be rotated. The drum shape of gear 84 provides for the continual engagement of said gear with gear 94, although gear 84 is moved back and forth with cradle 82. A sprocket 96 is affixed to the shaft 90 and a chain 98 engages the teeth of said sprocket. A pair of idler sprockets 93 and 95 are attached to support plate 24 (see FIGURES 1 and 2), and chain 98 is threaded around those sprockets and a drive sprocket 97 which is affixed to a motor 99. Motor 99 is attached to platform 72. Thus, the operation of motor 99 will drive chain 98 and result in the rotational movement of spindle 80.

Figure 6:
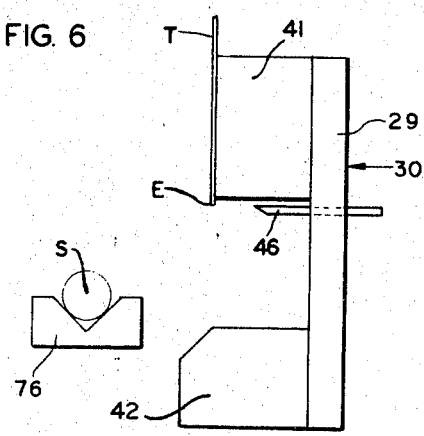
FIGURES 6 through 10 are schematic side elevational views of the wrapping mechanism of the machine, showing successive relative positions assumed by an article during a tape wrapping operation.

The taping operation of the machine is shown schematically in FIGURES 6 through 10. FIGURE 6 shows the relative positioning of a coil A on block 76 and tape deck 30 when the machine is in the rest position, which position is also shown in FIGURE 1. The tape T is threaded in the machine as is described above, with the free end of the tape E extending over the front of tacking block 41, adhesive side facing outwardly, and held flat against said block by application of a vacuum through hose 54 to vacuum port 53. Tape T is advanced to this position by a pair of power driven rollers 78, the peripheral surfaces of which rollers are preferably knurled since they contact the adhesive surface of the tape. The guide rollers which contact the back of the tape are idler rollers and the roller 79 which contacts the adhesive side of the tape is preferably knurled and is attached to tape chute 40 in such manner that it is permitted to rotate only in the clockwise direction when viewed as is shown in FIGURE 1, so that the tape T which extends forwardly of that roller is prevented from movement toward supply roll 51. Thus the downward movement of tape deck 30 from the up position to which it is moved by the action of air cylinder 37 will cause tape T to be pre-stripped from the slack controlled by take-up roller 58, and this amount of tape will be positioned between roller 79 and the roller which is attached to the upper front corner of tape plate 23. This pre-stripped amount of tape will then been available for movement down tape chute 40 when tape deck 30 is subsequently moved to the up position. When the machine is in the rest position, tape deck 30 is in the down position.

Figure 7:
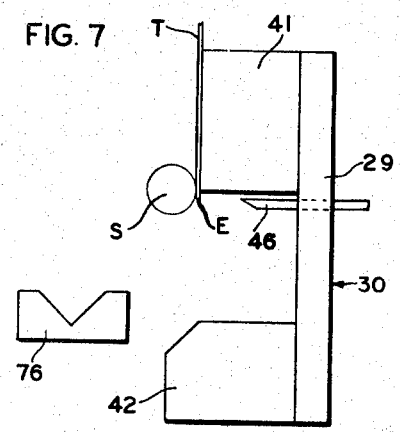

As is shown in FIGURE 7, the first step in the wrapping of the coil A is the movement of coil A from the block 76 toward and against the adhesive side of the end of tape E which is supported by tacking block 41. This movement is accomplished by the actuation of brake motor 71 to rotate wheel 70 through one-half a revolution, causing trunnion 60 to be pivoted from the rest position shown in FIGURE 1 to the position shown in FIGURE 2. With trunnion 60 in this position, compressed air is permitted to enter both of the air cylinders 86 and 87, to cause spindles 80 and 81 to move toward each other and grip the coil A through pressure between the ends of said spindles and the flanges F on each end of the coil, as is shown in FIGURE 2. Brake motor 71 is then actuated again to pivot trunnion 60 back into the position shown in FIGURE 1, so that the shaft portion S of the coil A is pressed against the adhesive side of the end E of the tape T, as is shown in FIGURE 7. The flanges F of the coil A have been removed in FIGURES 6–10, so that only the shaft S is shown in the drawings, for reasons of clarity.

Figure 8:
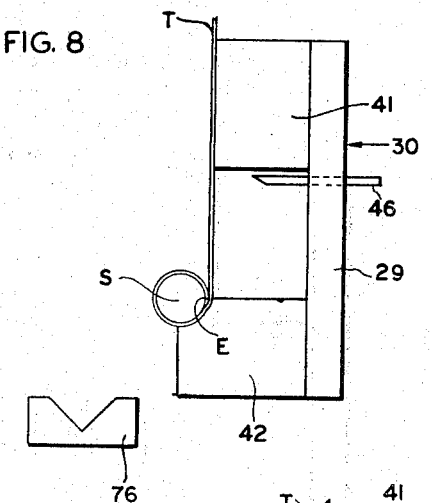
Figure 9:
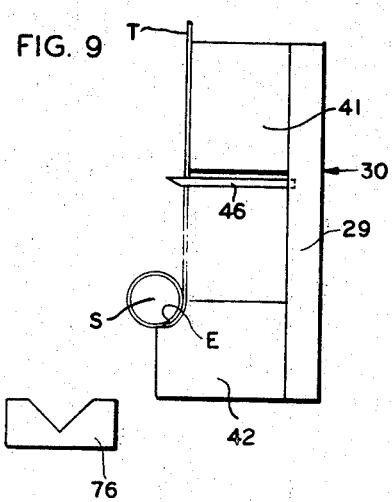
Figure 10:
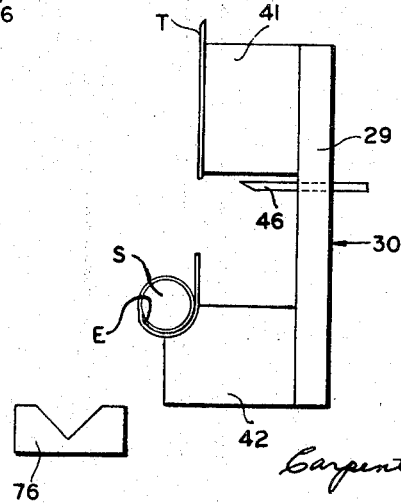

While the shaft S of coil A is held against the end E of tape T, as is shown in FIGURE 7, motor 99 is actuated to cause spindle 80 to be rotated in the clockwise direction, when viewed as is shown in FIGURES 6–10, and this movement causes coil A and spindle 81 to be rotated in that direction. After coil A has been rotated in this manner through approximately one revolution, to attach the end of the tape to shaft S, compressed air is permitted to enter air cylinder 37, causing tape deck 30 to be moved to the up position, moving buffing block 42 upwardly, and coil A is continued to be rotated as the buffing block 42 and the shaft S of coil A are in the relative position shown in FIGURE 8, so that tape T which is adjacent to the end will be attached to the shaft S. Buffing block 42 is preferably made of a resilient material, such as soft rubber or the bristles of a brush, so that the block is deformed slightly in order to provide some pressure against the back of the tape as it is attached to shaft S, as is shown in FIGURES 8–10; but a single point of contact across the width of the back of the tape would be sufficient. The rotational movement of coil A is continued as tape T is thus supported by buffing block 42, and tape is attached to shaft S until nearly as many winds of tape as are desired have been so attached to shaft S, at which time compressed air is permitted to enter air cylinder 50, causing knife 46 to be moved outwardly against the tape T to sever the tape across the width thereof, as is shown in FIGURE 9.

After the tape T has been so severed, tape T is no longer pulled downwardly over tape chute 40, and the movement of tape T through the machine is stopped. However, motor 99 continues to operate to cause coil A to continue to be rotated in order to buff the free end of the length of tape which was severed from tape T against the back of the tape which has been attached to shaft S, as is shown in FIGURE 10. Knife 46 is retracted by action of the spring in air cylinder 50 when the compressed air is released from said cylinder after tape T has been severed, so that said knife is again in the position shown in FIGURE 10.

After the end of the length of tape which was severed from tape T has been attached to the back of the tape which had been previously attached to shaft S, motor 99 is turned off, to stop the rotational movement of coil A. The compressed air is then released from air cylinder 87 and the advance side of air cylinder 86, so that spring 91 will act to retract spindle 81 from coil A, and compressed air is permitted to enter the retract side of air cylinder 86 to retract spindle 80 from contact with coil A. Since the flanges F on coil A are positioned along the sides of buffing block 42 when the coil is in the position shown in FIGURES 8–10, the flanges F are prevented from movement with either of the spindles 80 and 81 as said spindles are retracted, and coil A falls downwardly and out of the wrapping position in the machine as the spindles 80 and 81 are retracted. The compressed air is then released from air cylinder 37, and tape deck 30 moves downwardly, so that tacking block 41, buffing block 42 and the tape T with end E are again in the position shown in FIGURE 6. The machine is then in position to repeat the above operation in order to wrap tape on to another coil A which is placed on the block 76.

In order to facilitate the use of this machine to wrap spools of varying length, plates containing tacking blocks and buffing blocks of varying widths can be made for interchangeable attachment to slide plate 29, and such plates may be so attached very quickly. As is evident from the above description of an embodiment of my invention, variations in the operation and various modifications of my machine can be envisioned. For example, the wrapping operation can be accomplished through movement of the tape deck 30 against a coil which is rotating in a fixed location. Also, the coil can be moved into contact with a fixed tacking block and then moved into contact with a fixed buffing block, rather than providing movement of those blocks with the tape deck 30. Such variations, embodying some or all of the novel features herein disclosed are comprehended, and I do not intend to be limited only to the specific embodiment herein described, but, rather, I intend to be limited only by my disclosure taken as a whole, including the appended claims.

I claim:

1. A machine for wrapping an article with adhesive tape, said machine comprising a supporting structure, means attached to said supporting structure for rotating said article, a movable member attached to said supporting structure, a tacking member attached to said movable member for supporting the free end from a supply of said tape as said article is rotated during contact with said end of tape, to attach said end of tape to said rotating article, a buffing member attached to said movable member in spaced relationship to said tacking member for supporting tape adjacent to said end of tape as said article is rotated during contact with said tape adjacent to said end after said end has been attached to said article, to attach said tape adjacent to said end of tape to said rotating article, means for moving said movable member to move said tacking member and said buffing member after said end of tape has been attached to said rotating article, so that the support for the tape being attached to the rotating article is then shifted from said tacking member to said buffing member, and means attached to said movable member intermediate said tacking member and said buffing member for severing said supply of tape across the width thereof.

2. A machine for wrapping an article with adhesive tape, said machine comprising a supporting structure, means attached to said supporting structure for holding the article to be wrapped, means for rotating said holding means to rotate said article, a movable member attached to said supporting structure, means attached to said movable member for guiding tape from a supply of said tape, a tacking member attached to said movable member for supporting the free end from said supply of said tape as said article is rotated during contact with said end of tape, to attach said end of tape to said rotating article, a buffing member attached to said movable member in spaced relationship to said tacking member for supporting tape adjacent to said end of tape as said article is rotated during contact with said tape adjacent to said end after said end has been attached to said article, to attach said tape adjacent to said end of tape to said rotating article, means for moving said movable member to move said tacking member and said buffing member after said end of tape has been attached to said rotating article, so that the support for the tape being attached to the rotating article is then shifted from said tacking member to said buffing member, and means attached to said movable member intermediate said tacking member and said buffing member for severing said supply of tape across the width thereof.

3. A machine for wrapping an article with adhesive tape, said machine comprising a supporting structure, means attached to said supporting structure for supporting a rotatable supply roll of said tape, means attached to said supporting structure for holding the article to be wrapped, means for rotating said holding means to rotate said article, a movable plate attached to said supporting structure, means attached to said supporting structure and said plate for guiding tape from said supply roll and on to said plate, a tacking member affixed to said plate for supporting the free end from said supply roll of said tape as said article is rotated during contact with said end of tape, to attach said end of tape to said rotating article, a buffing member affixed to said plate in spaced relationship to said tacking member for supporting tape adjacent to said end of tape as said article is rotated during contact with said tape adjacent to said end after said end has been attached to said article, to attach said tape adjacent to said end of tape to said rotating article, means for moving said plate to move said tacking member and said buffing member after said end of tape has been attached to said rotating article, so that the support for the tape being attached to the rotating article is then shifted from said tacking member to said buffing member, a movable knife attached to said plate intermediate said tacking member and said buffing member for severing tape from said supply roll of tape across the width thereof, and means for transporting the means for holding the article to be wrapped to carry said article toward said tacking member and into contact with said end of tape as said end is supported by said tacking member and away from said buffing member.

4. A machine for wrapping an article with adhesive tape, said machine comprising a supporting structure, means attached to said supporting structure for supporting a rotatable supply roll of said tape, a trunnion pivotably attached to said supporting structure, means attached to said trunnion for holding the article to be wrapped, means for rotating said holding means to rotate said article, a movable plate attached to said supporting structure, means attached to said supporting structure and said plate for feeding and guiding tape from said supply roll on to said plate, a tacking block affixed to said plate for supporting the free end from said supply roll of said tape as said article is rotated during contact with said end of tape, to attach said end of tape to said rotating article, a buffing block affixed to said plate in spaced relationship to said tacking block for supporting tape adjacent to said end of tape as said article is rotated during contact with said tape adjacent to said end after said end has been attached to said article, to attach said tape adjacent to said end of tape to said rotating article, means for moving said plate to move said tacking block and said buffing block after said end of tape has been attached to said rotating article, so that the support for the tape being attached to the rotating article is then shifted from said tacking block to said buffing block, a movable knife attached to said plate intermediate said tacking block and said buffing block for severing tape from said supply roll of tape across the width thereof, and means for pivoting said trunnion to transport said article in said holding means from a position remote from said tacking block into contact with said end of tape which is supported by said tacking block and away from the position in which the tape is supported by said buffing block.

References Cited by the Examiner
UNITED STATES PATENTS

| | | | |
|---|---|---|---|
| 2,487,816 | 11/49 | Lindsey | 156—446 XR |
| 2,969,888 | 1/61 | Whiting | 156—468 |
| 3,017,313 | 1/62 | Lagasse et al. | 156—446 |

EARL M. BERGERT, *Primary Examiner.*